United States Patent [19]

Way

[11] 3,720,850
[45] March 13, 1973

[54] MAGNETOHYDRODYNAMIC POWER SYSTEM WITH SEMI-CLOSED CYCLE

[75] Inventor: Stewart Way, Pittsburgh, Pa.

[73] Assignee: Westinghouse Electric Corporation, Pittsburgh, Pa.

[22] Filed: April 30, 1970

[21] Appl. No.: 33,430

[52] U.S. Cl....................................................310/11
[51] Int. Cl................................................H02n 4/02
[58] Field of Search.........................................310/11

[56] References Cited

UNITED STATES PATENTS

| 3,467,842 | 9/1969 | Caprasse | 310/11 |
| 3,223,860 | 12/1965 | Brill | 310/11 |

Primary Examiner—D. X. Sliney
Attorney—A. T. Stratton, F. P. Lyle and Gordon H. Telfer

[57] ABSTRACT

An MHD power system is provided in which the working fluid consists of combustion gases that are recycled through an MHD generator with new fuel and oxidant being added and an equal mass of gas being discharged at some point in the cycle to provide what may be called a "semi-closed cycle." Such a cycle provides improved electrical conductivity of the working fluid as compared with open cycle systems that are operated with excess oxidant while it also provides increased mass flow as compared with open cycle systems that are operated without excess oxidant.

11 Claims, 6 Drawing Figures

MAGNETOHYDRODYNAMIC POWER SYSTEM WITH SEMI-CLOSED CYCLE

BACKGROUND OF THE INVENTION

1. Field of the Invention

This invention relates to magnetohydrodynamic power systems in which an EMF is derived by the motion of a conductive working fluid within a magnetic field. The term magnetohydrodynamic is sometimes abbreviated as "MHD."

2. Description of the Prior Art

MHD systems are known that use an open cycle. There are also known types of MHD systems that utilize a closed cycle. The open cycle systems are characterized by fuel and oxidant supplied to a combustion chamber with the products thereof supplied to the MHD generator and subsequently exhausted. In closed systems, the working fluid is recirculated through the MHD generator in a closed loop. The working fluid in such closed systems may be heated either by a nuclear reactor or by an externally fired heater. The working fluid itself is usually chosen from among the inert gases such as helium and argon. Both open and closed systems each have various advantages and disadvantages.

In general, open cycle systems have drawn the most interest for early practical application. As technology advances, it is possible to preheat the oxidant gases to increasingly high temperatures. This leads to an improvement in the overall efficiency of the system. The ability to preheat to a higher temperature suggests that the fuel to oxidant ratio can be made smaller so that the result is greater efficiency in terms of power generation per unit of fuel supply. It is known that the generated power is proportional to the mass flow of gas through the system. Thus, it would appear that, employing established concepts of the MHD art, it would be advantageous to use large quantities of oxidant, such as 75 or 100 percent excess air compared with that necessary for stoichiometric combustion of the fuel, when a preheat temperature such as within the range of about 2000° to 3000° K is attainable.

Another modification that is made possible as higher preheat temperatures are attainable, still following existing concepts, is to keep the fuel to air ratio essentially unaltered but simply allow the combustion temperature to assume the higher equilibrium value which is made possible by the higher preheat. This leads to more power being extractable from the gases expanding through the MHD generator, and hence more power produced per unit of fuel burned. Though this method of reaping a gain from higher preheat is possible it has technical disadvantages because of structural and durability problems.

Another relevant aspect of current arts pertains to gas turbines. In gas turbine technology a number of different types of gas cycles are employed including open, closed and semi-closed cycles. Significant differences in criteria exist, however, for the selection of a particular type of cycle in a gas turbine system as compared with the selection of a particular type of cycle in an MHD system. For example, in a gas turbine cycle it may be desirable to build up the pressure level of the operating gas throughout the system, and this may be facilitated by the use of a semi-closed cycle. This leads to more compact component sizes, while still retaining the simplicity of internal combustion for heat addition. Such purposes do not apply to the fuel burning MHD system and therefore from the state of the art existing prior to the present invention there was no obvious reason or advantage for employing a semi-closed cycle in an MHD power system.

SUMMARY OF THE INVENTION

According to the present invention, a semi-closed cycle is used in an MHD power system. By a semi-closed cycle is meant one in which new fuel and oxidant reactants are supplied to the system at the same time material is recirculated in the system, with a discharge of gas corresponding to the rate of additional new material added. The invention resides in part in the fact that while it is advantageous to increase the mass flow in the system for greatest power generation, if one seeks to reap benefits of higher preheat temperature, to do so through the expedient of supplying excess oxidant for corresponding increase in overall efficiency results in a serious drawback, namely, that as the oxidant to fuel ratio is increased, the electrical conductivity of the gas markedly decreases, at specified pressure and temperature.

The present invention circumvents the difficulty just mentioned. By recycling the combustion products, the conductivity is that corresponding to a near stoichiometric combustion products mixture. The conductivity of the mixture is very important as has been previously recognized in MHD power studies.

The advantage of recycling is increased when the fuel and oxidant are in close to stoichiometric proportions, or even on the fuel-rich side, and where such fuel and oxidant relation exists a power plant of minimum size can be provided for given power generation. Thus, use of recycled near-stoichiometric products yields a much more compact generator than use of a large amount of excess air. On the other hand, the benefit of product gas recycling can be taken in the form of higher pressure ratios and higher cycle efficiency if one prefers not to reduce the generator length. Still another option, if gas recycling is used, is a choice of whether to secure the advantage of a lower preheat temperature or a shorter MHD generator duct while keeping efficiency constant.

If raw oxygen were used as oxidant the attainable flame temperature is very high. By recycling combustion products as taught in this invention the operating temperature is somewhat reduced, and the mass flow is increased. Efficiency is improved by virtue of the larger mass flow, and the electrical conductivity is superior to what it would be if simply extra diluent air were blended with the oxygen.

Another advantage of using recycled products rather than excess air is that the formation of nitric oxide is very considerably reduced. This nitric oxide (NO) is a disagreeable air pollutant.

A further advantage of recycling the combustion products, irrespective of the use of high air preheat temperature, pertains to the general desirability of running with excess fuel to obtain better electrical conductivity. Without use of products recycling, the mass flow per unit of fuel burned is reduced when we burn with excess fuel, and this degrades plant efficiency. By recycling some combustion products this defect in mass flow can be removed.

The desirability of recycling combustion products in combustion fired MHD plants may have been missed, in the past, because MHD engineers (1) generally associated higher air preheat temperature with higher flame temperature; (2) they were not fully aware of the marked effect of excess air on lowering the conductivity; or (3) they would tend to regard the semi-closed cycle in the framework of gas turbine technology where high pressure is advantageous, whereas very high pressures are disadvantageous in MHD cycles.

DESCRIPTION OF THE PREFERRED EMBODIMENTS

Figure 1:
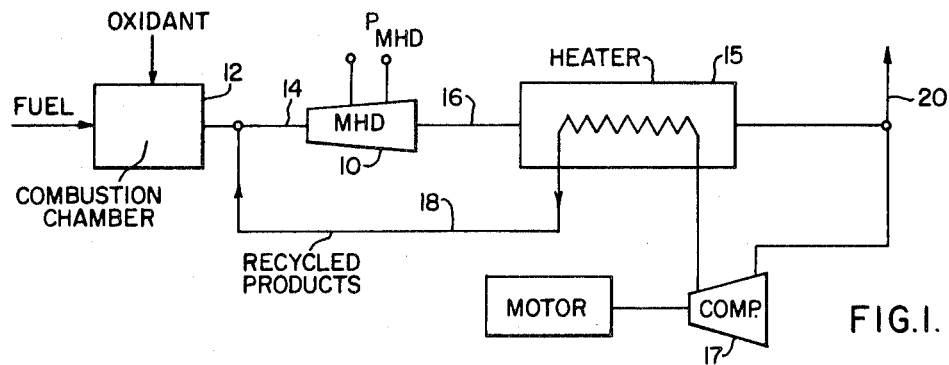
FIG. 1 is a schematic diagram of a simple MHD power system embodying the present invention.

Referring to FIG. 1, an MHD generator is shown from which electrical power, PMHD, is derived, by reason of flow through it, in the presence of a magnetic field, of a working fluid that is conductive. The invention is most advantageously employed in a system in which the working fluid consists of gaseous products of the combustion of a fuel. Such fuels include, as examples, coal, oil, natural gas, gas produced from coal, carbon monoxide, char and various hydrocarbon fuels. Such fuels are relatively inexpensive and plentiful and provide good possibilities for MHD power systems that are economical.

In the system of FIG. 1, such a fuel and an oxidant, such as air, oxygen, or oxygen enriched air, are supplied to a combustion chamber 12 in which the fuel is burned and gaseous products thereof are subsequently applied to the inlet 14 of the MHD generator. (If air is a constituent of the oxidant, air preheating is generally required, but it is not shown in FIG. 1.) The gases emitted from the outlet 16 of the MHD generator, essentially unchanged in form from those supplied at the inlet, are in accordance with this invention recycled through loop 18 from the outlet 16 back to the inlet 14 of the MHD generator where they are mixed with new combustion products and reintroduced into the generator. An amount of gas is discharged from the system, such as to the atmosphere through a stack 20, equal in mass, at least over substantial periods of time in which the system reaches a state of equilibrium, to the quantity of combustion products newly introduced as a result of combustion in the combustion chamber 12. The recycled combustion products are, in recycling path 18, compressed by compressor 17 and preheated in heater 15.

Systems in accordance with this invention, as exemplified by that schematically shown in FIG. 1, may be properly described as systems operating on a "semi-closed cycle." A quantity of the utilized material is recirculated and reused but is however mixed with new material. The ratio of recycled to new combustion products employed in the system may be widely varied, depending on the amount of preheat employed and values of other selected parameters. Although it is conceivable to operate an MHD system on a closed cycle which might employ fuel combustion products that after an initial period of production in the system are then sealed off, such a system would result in disadvantages of a very high temperature of operation of the heat exchanger where the working fluid is heated and added thermodynamic losses in the heat of the gases passing from the furnace to the stack. Although MHD power systems have been previously disclosed that operate on open cycles and others that operate on closed cycles, it has not been previously disclosed to operate an MHD power system on a semi-closed cycle. Furthermore, while the concept of a semi-closed cycle is well known in gas turbine technology, it is used for reasons inapplicable to MHD power systems. The present invention results in part from the fact that it is newly recognized that there are distinct advantages for operating an MHD power system on a semi-closed cycle.

It is known that the power derived from an MHD power system is directly proportional to the specific enthalpy drop of the working fluid as it passes through the energy converter and also to the mass flow of working fluid through the system. If is of course desired to maximize the power generated per unit of supply fuel. The relation of MHD power and mass flow suggests that an improvement in generated power, and the overall efficiency of the power generation process since no additional magnetic field is required, may be achieved by the supply of excess oxidant in the working fluid in order to increase the mass flow in the system. Fitting with this is the fact that with advancing technical progress it is possible to heat gases to increasingly high temperatures. Regenerative heat exchangers have been proposed for this purpose. This makes it possible to increase the temperature of the oxidant with the result that the fuel to oxidant ratio can be reduced while still achieving high efficiencies, perhaps over 60 percent. These considerations would suggest that as the permissible oxidant preheat temperature is raised, more excess oxidant may be used for a good overall power generation efficiency. More careful consideration, however, reveals that there is a major difficulty that is over-looked in the foregoing considerations and that is that as the oxidant to fuel ratio is increased, the conductivity of the gas decreases.

The difference in conductivity can be shown by considering a system wherein air is supplied with the fuel in an amount of 75 percent in excess of that required for stoichiometric combustion with the fuel. With a generator inlet static pressure of 3.5 atmospheres and a generator inlet temperature of 2600° K, and 0.7 percent by weight cesium seeding, it can be shown by calculations that the generator inlet conductivity is about 6 mhos per meter. (Calculating the conductivity of a gas with considerably accuracy is possible from fundamental physical concepts. Reference may be made for an example of such calculations to a paper by L. S. Frost appearing in the Journal of Applied Physics, V. 32, (1961), p. 2029 and also to the paper of I.S. Tuba, R.L. Chambers, W.E. Young and S. Way in April, 1965, Transactions of the ASME, Journal of Engineering for Power, V. 87(A), p. 125.)

On the other hand, it can be similarly shown that with the same system under all of the same conditions, except that now the air and fuel exist in a stoichiometric mixture, the generator inlet conductivity is about 10 mhos per meter. That is, this conductivity would result in a conventional open cycle system in which fuel and oxidant are continuously supplied and discharged subsequent to passing through the MHD generator.

In accordance with this invention the system utilizes recycled combustion products for increased mass flow without sacrifice in conductivity in that new fuel and oxidant may be supplied in stoichiometric proportions. Such a mixture of recycled combustion products and new products provides the same inlet conductivity, in the above example, of about 10 mhos per meter. In the second case, where recycled combustion products take the place of the 75 percent excess air of the first case, the mass involved is nearly the same. Yet the conductivity at generator inlet is about 70 percent higher in the second case than in the first. Temperature levels are essentially the same in both cases, both for preheat and combustion chamber temperatures. Plant efficiencies will be over 60 percent in both cases. However, while the MHD generator length (with appropriate design assumptions), of the example with excess air is about 17 meters, that of the example with recycled combustion products will be only about 10 meters. Such a shorter length greatly reduces the cost of the superconducting magnet which is one of the major expense items of the power plant.

The advantage of the higher conductivity resulting from the use of stoichiometric combustion products can be taken in another way. This is, without reducing the generator length, the pressure ratio of inlet to outlet of the generator duct may be increased and thereby the plant efficiency is raised. Another alternative advantage that could be taken of the recycling feature is to permit the use of lower preheat temperatures. It can be seen that the present invention gives the system designer considerable flexibility in choice of factors of system economy and efficiency.

The improved electrical conductivity in systems in accordance with the present invention as compared with those using gas mixtures with a large amount of excess oxidant can be accounted for from the excessive formation of negative OH ions in the latter case. When each negative ion is formed there is effectively a removal from the system of a conduction electron. The following table results from calculations of equilibrium composition, electron mobility, electron density, and electron conductivity for systems in which char is used as the fuel, burned with moist air, with 0.7 percent by weight cesium seeding and the gas state at 1 atmosphere and 2300° K, typical of the generator outlet conditions.

|  | Stoichiometric Air and Fuel | 75% Excess Air |
| --- | --- | --- |
| conductivity (mhos/m.) | 5.142 | 2.285 |
| mobility (m$^2$/v. sec.) | 1.233 | 1.324 |
| electron density (m.$^{-3}$) | 2.61 × 10$^{19}$ | 1.08 × 10$^{19}$ |
| mole fraction OH | 0.00190 | 0.00291 |
| mole fraction O | 0.00047 | 0.00142 |
| mole fraction Cs | 0.000553 | 0.000402 |
| mole fraction NO | 0.00332 | 0.01019 |
| mole fraction NO$_2$ | 1 × 10$^{-6}$ | 7 × 10$^{-6}$ |

The higher conductivity for the instance in which no excess air is supplied must be accounted for by the higher electron density. This higher electron density can only partially be accounted for by the higher concentration of cesium atoms (conductivity is proportional to the square root of cesium concentration). The major contributing factor is concluded to be the lower concentration of ionic species of OH, O, NO and NO$_2$. Since OH is the most prominent negative ion species, and since NO is of little consequence because of its low electron affinity (0.5 e.v. compared to 1.83 e.v. for OH) it is believed that OH is chiefly responsible, through formation of OH$^-$, for the lower conductivity of the gas in the right hand column.

It is to be understood that, in systems incorporating the present invention, it is not essential that the combustion reaction occur with a stoichiometric mixture of fuel and oxidant. It is known, for example, that an excess of fuel would be beneficial to electrical conductivity. An excess of oxidant is tolerable but generally speaking greater advantage is taken of the recycling of combustion products when the mixture is near to stoichiometric or slightly fuel rich. Thus, to realize the advantages of the present invention it is not necessary to set the ratio of fuel and oxidant to any narrow limit or at any specific value. Generally speaking, substantial advantage can be taken of the present invention in systems operating with fuel and oxidant supplied in quantities within a least 10 percent of stoichiometric quantities on either side, fuel rich or oxidant rich.

The expedient of seeding the working fluid with an alkali metal such as cesium or potassium is contemplated for use in systems in accordance with this invention as has been in prior use in MHD systems. That is, the considerations concerning the need for such a seeding material in order to increase the conductivity of the working fluid remain the same here as before. The extent of seeding, the extent of preheating of oxidant and recycled combustion products and the mixture ratio of the working gas all have to be with the achievement of a particular desired conductivity of the working fluid which in a general case should be at least 5 mhos per meter in systems of practical interest. It is known that a regenerative heater with a matrix of high purity magnesium oxide can be built to function effectively with ash free gases at preheat temperatures of about 1950° K. Description of such a heater may be found in an article by F. Hals and L. Keefe entitled "A High Temperature Regenerative Air Preheater For MHD Power Plants" presented at the International Symposium on MHD Electrical Power Generation, Salzburg, Germany, July 1966. If such high temperature air preheating is used the present invention becomes particularly attractive, although it can also be used advantageously with more moderate air preheating.

Figure 2:
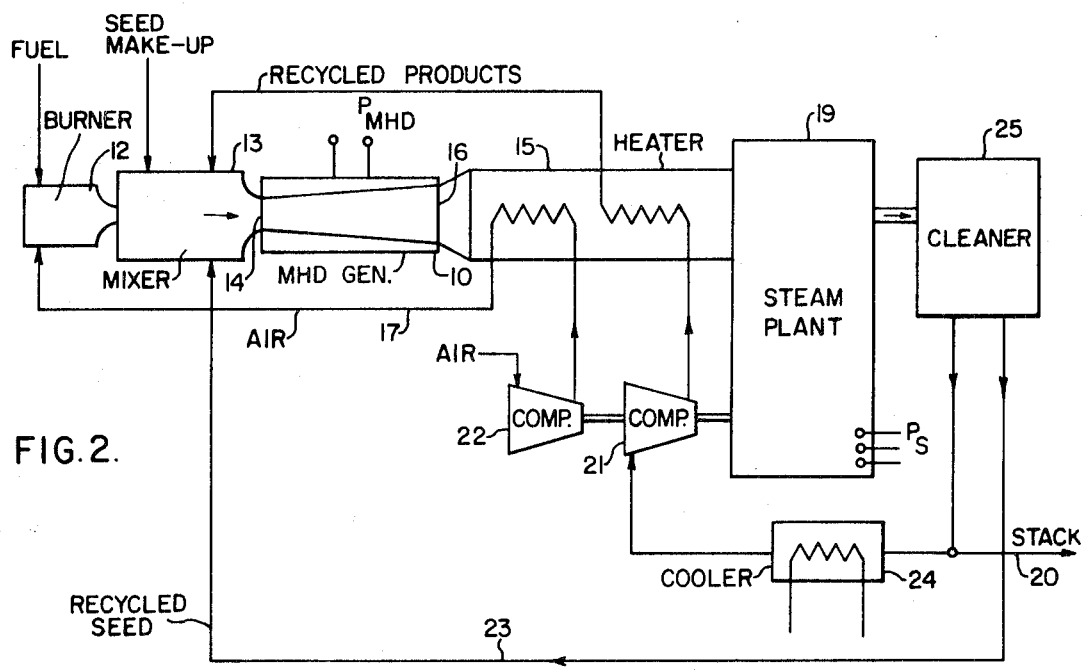
FIGS. 2 through 6 are schematic diagrams of more specific embodiments of the present invention.

Referring now to FIG. 2, there is shown in more detail an example of a system in accordance with the present invention. Here there is shown a burner or combustion chamber 12 in which fuel is burned with air and the combustion products introduced into a mixing chamber 13 to which is also supplied alkali metal seeding material and recycled seed and combustion products. The mixture is then supplied to the inlet 14 of an MHD generator 10. The working fluid emitted from the outlet 16 of the MHD generator goes to a heater 15 and provides a medium for heating air to be supplied to the burner through path 17 and also for heating combustion products that are recycled through path 18 just prior to being introduced into the mixing chamber 13. Thereafter, there may be provided a steam plant 19 which is optional but is generally preferred to derive a certain additional amount of power $P_S$. (A gas turbine plant could be used in lieu of the steam plant.) Power from the steam plant 19 can be used to drive compressors 21 and 22 for the recycled combustion products and for air taken in from the atmosphere, respectively. Subsequent to the steam plant 19 the material is passed through a cleaner 25 in which the alkali seed compounds and any ash or other contaminants are removed and the seed material is recycled through path 23 while the combustion products are recycled after first passing through a cooler 24. A stack 20 is provided for the discharge from the system of a mass of gas equivalent to that introduced by the fuel and air supply to the combustion chamber.

In the described system of FIG. 2 there are illustrated separate burner and mixing chambers 12 and 13 which may be desirable in order to insure against having the combustion occur in a vitiated oxygen atmosphere, although it is contemplated that the combustion as well as the mixing of the various gases may all take place within a single chamber since the temperature is high enough to cause chemical reactions to proceed at high velocity.

The system of FIG. 2 contemplates the use of air as the oxidant which is a matter of choice for the designer. If pure oxygen is used as the oxidant, rather than compressed air, a further improvement in conductivity is realized because the moisture ordinarily present in atmospheric air is eliminated. However, there is encountered the disadvantage of having an oxygen plant to separate oxygen from air but that disadvantage would be offset to some degree by a great reduction in the required power of the compressors. Oxygen enriched air, that is a mixture of air and oxygen, may also be used as the oxidant.

New fuel and oxidant are suitably supplied sufficient to produce combustion gases in a ratio of from about 0.05 to 5.0 parts of recycled combustion products to 1 part new combustion products, where the oxidant is raw oxygen. Where the oxidant is air, about 0.05 to 2 parts recycled combustion products to 1 part new combustion products is suitable.

As previously mentioned herein, any of a variety of fuels may be used in systems in accordance with this invention. Among those presently of interest are low cost fuels derived from coal. Char is a fuel derived from coal by removal of a large portion of volatile constituents. It may be available in the future in fairly large quantities in the course of production of gaseous or liquid fuels from coal. It is especially attractive as an MHD power plant fuel because of its low hydrogen content which leads to superior electrical conductivity in the product gases when alkali seed material is added. Conceptual studies have been made of char burning MHD systems in which combustion products are recycled. These studies are reported in a paper by the present applicant entitled "Char Burning MHD Systems" and available as a preprint from the American Society of Mechanical Engineers, paper 69-WA/Ener- 13., Winter Annual Meeting, November 1969. Reference should be made to that paper for analysis and discussion of such systems.

FIGS. 3 through 6 illustrate char burning MHD systems that will be briefly described by way of further example of the present invention. It should be understood of course that in considerable part the description applies to systems utilizing fuels other than char. Systems using coal itself may be designed in a manner similar to those of the char system.

In char burning systems, the char may be reacted with hot carbon dioxide to give a fuel gas rich in carbon monoxide. The carbon monoxide then acts as the fuel in the main combustion chamber. This procedure has the advantage of providing a clean gaseous fuel and permitting a very high preheat temperature since preheaters can operate hotter with clean gases. An alternate procedure is to burn the char or coal in a special combustion chamber which rejects most, but not all, of the ash. The present invention is still applicable although preheat temperature and attainable efficiency will not be so high. U.S. Pat. No. 3,358,624 by the present applicant may be referred to for description of a suitable combustion chamber.

Figure 3:
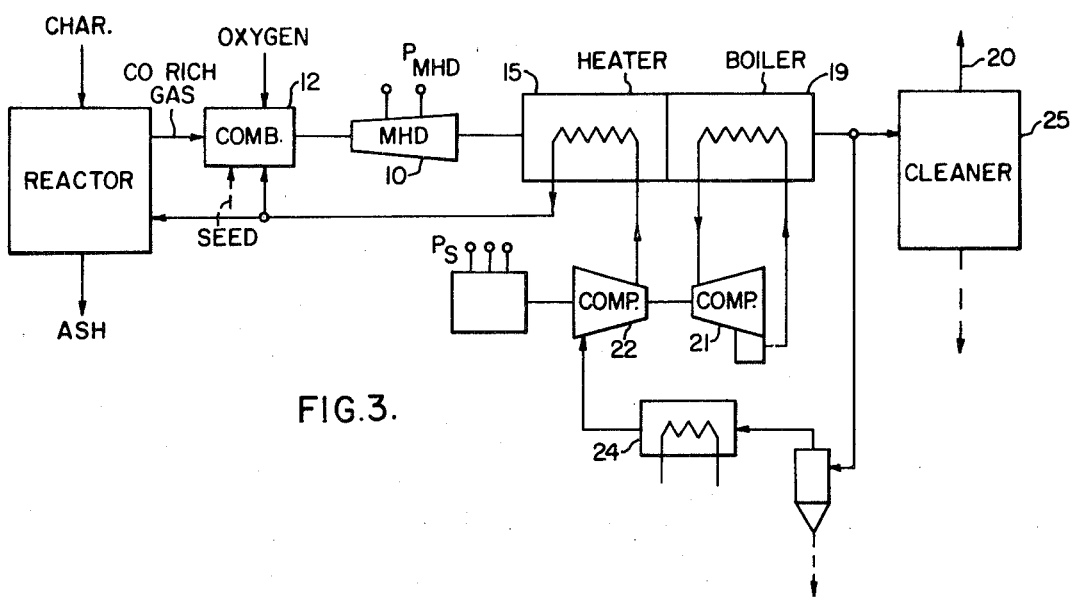

In FIG. 3 there is shown a system in which a char reactor 30 is ahead of the MHD generator 10. From the char reactor 30 a CO rich gas is supplied to a combustion chamber 12 for combustion, with oxygen, producing products that are approximately 90 percent $CO_2$ and 8% $H_2O$. This gas, after doing its work in the generator 10, goes through the heat recovery system including a heater 15 and a boiler of a steam plant 19. Then a portion goes to the cleaner 25 and to the stack 20 while the other portion after scrubbing is recycled back to the reactor combustor system. To achieve the best heat rate, it is desired to have maximum preheating and as large a ratio as possible of recycled gas to oxygen. Such a ratio can be as high as 4 to 1.

Figure 4:
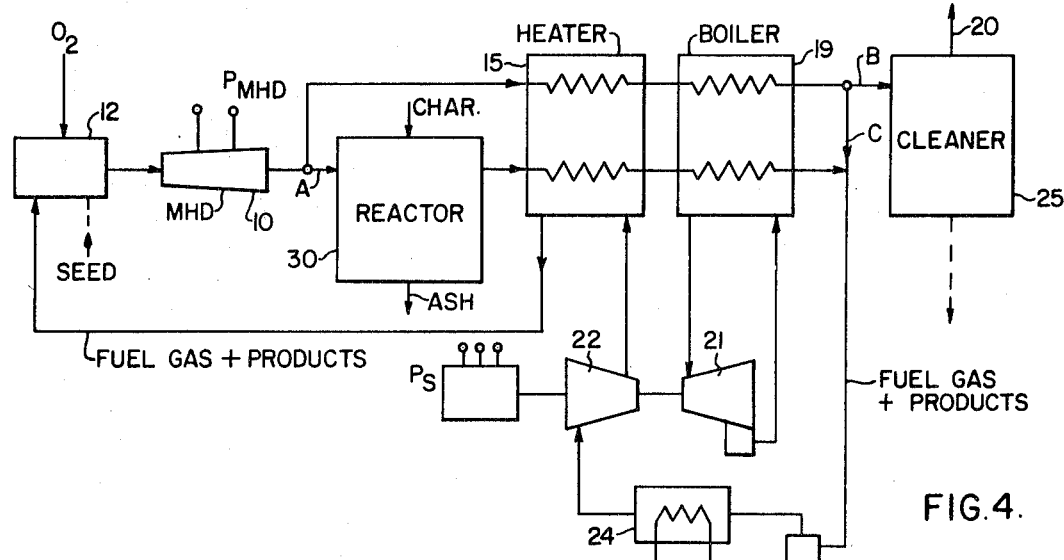

In FIG. 4, the char reactor 30 is placed downstream of the MHD generator 10. The stream leaving the MHD generator 10 consists of three parts designated A, B and C. A first part A goes to the char reactor 30. A second part B is discharged through the stack 20 (preferably removing particulate matter) and a third part C is recycled as diluent in the system. The latter two portions are diverted together immediately after the MHD generator 10. Part C is recombined with the portion A that goes through the reactor 30 after going through heat recovery elements 15 and 19. For best heat rate, maximum exhaust heat recovery must be obtained and the compressor 22 should operate at the lowest possible inlet temperature. It has been proposed to use a molten salt bath in the char reactor for mechanical and heat transfer reasons. Such a molten salt bath may also serve as a seed trap, making further seed recovery from the stream unnecessary although as shown a scrubber may be used in the system. The arrangement of FIG. 4 employs what is sometimes referred to as chemical regeneration. That is, a portion of the heat of the exhaust stream comprises the heat of endothermic reaction of the fuel and carbon dioxide to form a fuel gas. FIG. 4 shows such a chemical regeneration system combined with the gas recycling as taught in the present invention.

Figure 5:
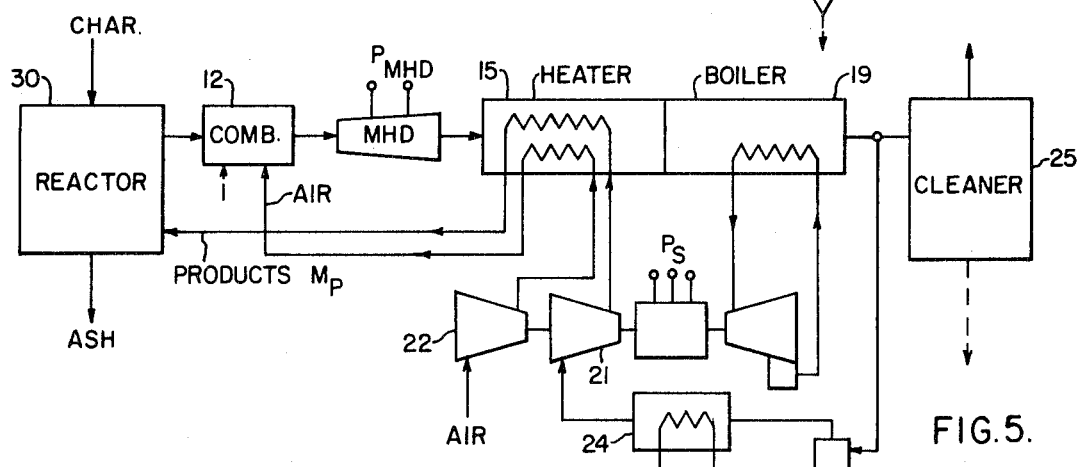
Figure 6:
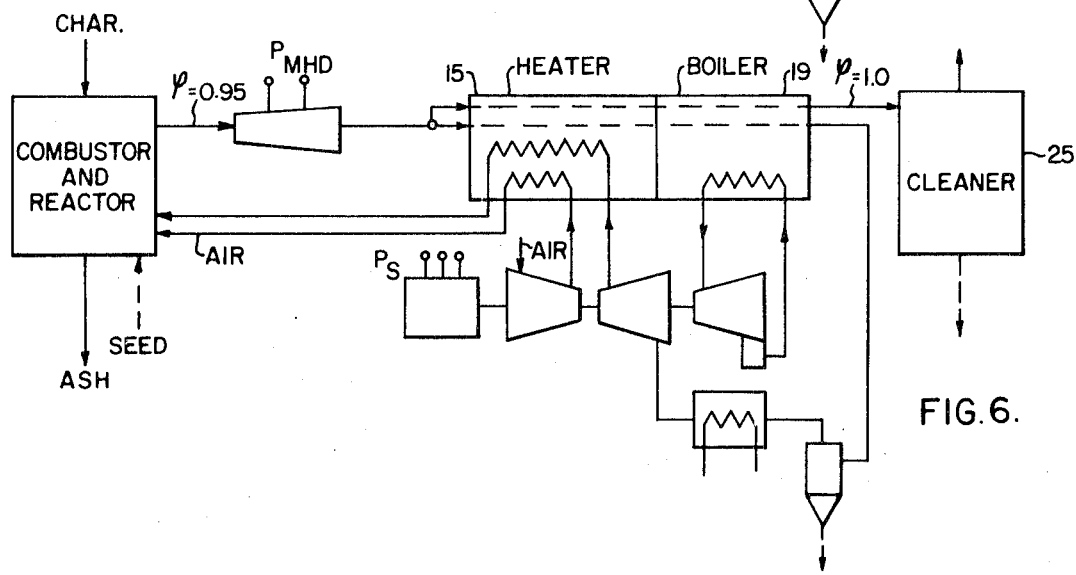

In FIG. 5 an air operated system is shown that is similar to that of FIG. 4 with however the char reactor shown in front of the combustion chamber in a manner similar to that of the oxygen operated system of FIG. 3. In FIG. 6 another air operated system is illustrated that is intended to operate on the slightly fuel rich side, about 0.95 percent of stoichiometric air to fuel ratio. Additionally the system of FIG. 6 includes the char reactor and combustor together which would be a desirable expedient although they may be physically separated.

These various systems have all been subjected to detailed analysis which is reported in the aforementioned publication by the present applicant and all include as a part thereof the recycling of combustion products in accordance with the present invention.

Although the systems portrayed in FIGS. 3 through 6 indicate gasification of the char or coal, it should be kept in mind that, at least in FIGS. 5 and 6, a combustion system could be used which does not necessarily first gasify the fuel. Thus, coal or char can be burned in a multi-stage cyclone combustor rejecting 90 to 95 percent of the ash.

In the foregoing discussion it will be understood that when we speak of venting to the stack an amount of gas equal in mass to the mass of new fuel and oxidant continuously added, we also imply venting the small amount of seed material that inevitably escapes through the cleaner, and which is balanced by the makeup seed material injected ahead of the MHD generator.

The drawing and descriptions of the arrangement of components in the MHD power plants given here do not reflect details of minor auxiliaries such as pumps, coolers, feedwater heaters, wall cooling coils and the like, and it will be understood that such drawings are schematic, and that absence of such details does not limit the type of power plant to which this invention of semi-closed cycle MHD operation is applicable. Moreover the indication of the sequential arrangement of heat exchangers, particularly as between boiler and oxidant and recycled product heaters, is not an essential feature of the invention and is subject to adjustment, modification and rearrangement by a designer who is versed in the MHD art.

I claim:

1. In a MHD power system: an MHD generator; means to burn fuel with oxidant and supply combustion products thereof to said generator; means to recycle combustion products that have passed through said MHD generator for reintroduction therein, while venting a flow equivalent to the rate of supply of new fuel and oxidant.

2. The subject matter of claim 1 further comprising: means to heat said oxidant prior to combustion with said fuel and also to heat said recycled combustion products before reintroduction in said MHD generator.

3. The subject matter of claim 1 wherein: said means to burn fuel with oxidant and supply combustion products thereof to said generator comprises a combustion chamber with means to supply fuel and oxidant thereto for combustion therein and a mixing chamber with means to supply combustion products from said combustion chamber to said mixing chamber, means to supply said recycled combustion products to said mixing chamber, means to supply an alkali metal seeding material to said mixing chamber, and means to supply mixed gaseous material from said mixing chamber to said MHD generator.

4. A semi-closed cycle MHD power system comprising: an MHD generator having an inlet and an outlet for a working fluid having conductivity and means to derive an EME resulting from flow of said working fluid between said inlet and said outlet; a chamber connected with said inlet to form therein said working fluid and to supply said working fluid to said inlet, said working fluid comprising (1) a quantity of fuel combustion products that have not previously been cycled through said system, (2) a quantity of fuel combustion products that have previously been cycled through said system, and (3) an alkali seeding material; a heater chamber connected with said generator outlet with means to heat oxidant prior to fuel combustion and to heat combustion products prior to recycling; means to permit discharging from said system a quantity of gas equal in mass to said quantity of fuel and oxidant that have not previously been cycled through said system.

5. A method of operating an MHD power system comprising the steps of: supplying combustion gases resulting from fuel combustion to an MHD generator, said gases including new combustion gases resulting from combustion of newly introduced fuel and combustion gases that are recycled combustion products; and discharging a quantity of gas from the system that is equal in mass to the new combustion gases supplied.

6. The subject matter of claim 5 wherein: said combustion gases are formed from fuel combustion with air that has been preheated prior to said combustion and said recycled combustion gases are also heated prior to reintroduction in said generator.

7. The subject matter of claim 6 wherein: said combustion gases are supplied in a ratio of from about 0.05 to 5.0 parts recycled combustion products to 1 part new combustion products.

8. The subject matter of claim 5 wherein said new combustion products are generated by first producing an ash free gaseous fuel through reaction of a coal derived fuel with all or a portion of said combustion gases that are recycled, and burning said ash free gaseous fuel with oxidant in a combustion chamber ahead of the MHD generator.

9. The subject matter of claim 5 wherein said new combustion products are formed by reaction of a coal derived fuel with preheated oxidant in a combustion chamber designed to separate out a major fraction of the ash.

10. The subject matter of claim 5 wherein the recycled combustion products are introduced into the combustion chamber in which reaction of fuel and oxidant is taking place, so that mixing of said recycled gases and chemical reaction of fuel and oxidant take place simultaneously and in the same chamber.

11. The subject matter of claim 5 wherein the fuel is first caused to react with the combustion products leaving the MHD generator to form a gaseous fuel, and wherein said gaseous fuel is then burned in a combustion chamber with oxidant ahead of the MHD generator, and wherein additional recycled products which are compressed and preheated are then introduced into and mixed with the combustion products coming from said combustion chamber prior to entering the MHD generator.

* * * * *